United States Patent
Guillois et al.

(10) Patent No.: US 12,116,931 B2
(45) Date of Patent: Oct. 15, 2024

(54) AIR INTAKE FOR A TURBOJET ENGINE NACELLE

(71) Applicant: Safran Nacelles, Gonfreville l'Orcher (FR)

(72) Inventors: Denis Guillois, Moissy Cramayel (FR); Fabienne Quenu, Moissy Cramayel (FR); Anne Mounier, Moissy Cramayel (FR); Franck Philippe Gérald Zaganelli, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 57 days.

(21) Appl. No.: 17/510,785

(22) Filed: Oct. 26, 2021

(65) Prior Publication Data

US 2022/0042455 A1    Feb. 10, 2022

Related U.S. Application Data

(63) Continuation of application No. PCT/EP2020/060990, filed on Apr. 20, 2020.

(30) Foreign Application Priority Data

Apr. 26, 2019 (FR) .................... 19/04427

(51) Int. Cl.
F02C 7/045 (2006.01)

(52) U.S. Cl.
CPC .......... F02C 7/045 (2013.01); *F05D 2220/32* (2013.01); *F05D 2230/20* (2013.01); *F05D 2230/60* (2013.01)

(58) Field of Classification Search
CPC ........ F02C 7/04; F02C 7/045; F05D 2220/32; F05D 2230/20; F05D 2230/60
See application file for complete search history.

(56) References Cited

U.S. PATENT DOCUMENTS

| | | | | |
|---|---|---|---|---|
| 5,433,418 A | * | 7/1995 | Nowak | B29C 33/565 425/389 |
| 2006/0210821 A1 | * | 9/2006 | Eilert | B29C 51/267 264/511 |
| 2011/0014044 A1 | | 1/2011 | Vauchel et al. | |
| 2011/0197973 A1 | * | 8/2011 | Binks | B64D 33/02 137/15.1 |

FOREIGN PATENT DOCUMENTS

| | | |
|---|---|---|
| EP | 2241504 | 10/2010 |
| FR | 3031341 | 7/2016 |
| WO | 2014170609 | 10/2014 |

OTHER PUBLICATIONS

International Search Report for International Application PCT/EP2020/060990, mailed Jun. 29, 2020.

\* cited by examiner

*Primary Examiner* — Steven M Sutherland
(74) *Attorney, Agent, or Firm* — Burris Law, PLLC

(57) ABSTRACT

An air intake of a turbojet engine nacelle includes an air intake lip, an annular structure, a rear partition, and at least one acoustic attenuation structure. The annular structure includes at least a part of an outer fairing and an inner fairing joined to each other by the air intake lip. The rear partition is connected to the inner fairing. The acoustic attenuation structure is attached to the inner fairing of the annular structure. At least part of the outer fairing, the air intake lip and the inner fairing are integral with each other.

18 Claims, 4 Drawing Sheets

AIR INTAKE FOR A TURBOJET ENGINE NACELLE

CROSS-REFERENCE TO RELATED APPLICATIONS

This application is a continuation of International Application No. PCT/EP2020/060990, filed on Apr. 20, 2020, which claims priority to and the benefit of FR 19/04427 filed on Apr. 26, 2019. The disclosures of the above applications are incorporated herein by reference.

FIELD

The present disclosure relates to an air intake for a turbomachine nacelle such as a turbojet engine or an aircraft turboprop engine.

BACKGROUND

The statements in this section merely provide background information related to the present disclosure and may not constitute prior art.

An aircraft is propelled by one or more propulsion units each comprising a turbojet engine/turboprop engine housed in a tubular nacelle. Each propulsion unit is attached to the aircraft by a mast generally located under a wing or at the level of the fuselage.

A nacelle generally has a structure comprising an upstream section forming an air intake upstream of the turbojet engine, a median section configured to surround a fan of the turbojet engine, a downstream section capable of accommodating thrust reversal means and configured to surround the combustion chamber of the turbojet engine, and is generally terminated by an ejection nozzle whose outlet is located downstream of the turbojet engine.

The air intake is used to improve the air capture desired to supply the fan of the turbojet engine throughout the flight envelope and to channel the air towards the fan.

The air intake comprises an air intake lip forming a leading edge, attached to an annular structure. The annular structure comprises an outer fairing providing the outer aerodynamic continuity of the nacelle and an inner fairing providing the inner aerodynamic continuity of the nacelle, in particular with the fan casing at the level of the median section. The air intake lip provides the upstream junction between these two fairings. The inner fairing and the outer fairing are generally secured to a rear partition which delimits the air intake and the median section of the nacelle.

In more recent developments, the air intake lip has been integrated into the outer fairing, thus forming a one-piece or integral part.

The one-piece part forming an elongated air intake lip of the nacelle is particularly desirable for aerodynamic reasons, in order to extend downstream the laminar air flow zone.

The elongated air intake lip can be secured to the rear partition directly or indirectly by means of a mounting flange. Likewise, the inner fairing can be secured to the partition or rear support directly or indirectly by means of a mounting flange or a fishplate.

The elongated air intake lip and the inner fairing are secured upstream by means of fixing flanges.

These fixing flanges or joint bars provide mechanical rigidity between the elongated air intake lip and the inner fairing.

Such an assembly of the elongated air intake lip with the inner fairing has the disadvantage of inhibiting improved air flow at the junction between the elongated air intake lip and the inner fairing.

Moreover, in such an assembly, the elongated air intake lip is brought into a compliant position with the inner fairing, then fixing of the elongated air intake lip to the inner fairing is made by means of a series of fixing flanges or joint bars.

It will be understood that such an assembly involves carrying out a large number of assembly steps inducing an expensive production cost.

In addition, due to the use of these fixing flanges or joint bars, the overall mass of such an air intake is increased.

SUMMARY

This section provides a general summary of the disclosure and is not a comprehensive disclosure of its full scope or all of its features.

The present disclosure provides an air intake allowing an improved laminar flow of air while simplifying its architecture.

In this regard, according to a first form, the present disclosure provides an air intake for a turbojet engine nacelle comprising an annular structure and a rear partition. The annular structure includes at least part of an outer fairing and an inner fairing attached to each other by an air intake lip. The inner fairing being connected to the rear partition. The air intake being advantageous in that the annular structure includes at least part of the outer fairing. The air intake lip and the inner fairing are materially integral and in that the air intake further comprises at least one acoustic attenuation structure attached to the inner fairing of the annular structure.

The expression "materially integral" means mechanical elements made integral. In other words, these mechanical elements are formed in one piece and are manufactured in one piece.

Advantageously, the rear partition is structuring, that is to say it provides a path for taking up the radial loads between the mechanical elements to which it is connected, in particular between the inner fairing and the outer fairing of the air intake.

The term "radial" will be understood to mean a radial direction with respect to a longitudinal direction of the nacelle.

It will then be understood that the air intake thus formed has an air intake lip at least formed materially integral of the air intake lip with the inner fairing, extended to the rear partition to which it is connected.

Of course, at least part of the outer fairing is also materially integral with the above air intake lip.

Thus, by providing an air intake whose annular structure is formed in a single piece, the architecture of the air intake is simplified and there is no need for junction elements, such as fixing flanges between the inner fairing and the air intake lip. Furthermore, the inner fairing of continuity with the air intake lip allows a laminar flow of air flowing along the air intake lip and the inner fairing. The manufacture of the air intake is also simplified.

According to one variation, the annular structure and the air intake lip are made of a composite material.

According to another variation, the annular structure and the air intake lip are made of a metallic material.

According to yet another variation, the inner fairing is directly connected to the rear partition.

According to one variation, the inner fairing is connected to the rear partition by means of a rear fixing flange. In other words, the extended lip as defined can be connected directly to the rear partition or indirectly to the latter via a rear fixing flange.

According to another variation, the air intake comprises an intermediate junction connected to at least part of the outer fairing to form the outer fairing, the intermediate junction being connected to the rear partition.

According to yet another variation, at least part of the outer fairing is directly connected to the intermediate junction.

According to one variation, at least part of the outer fairing is connected to the intermediate junction by means of a junction flange.

According to another variation, the intermediate junction is connected directly to the rear partition.

According to yet another variation, the intermediate junction is connected to the rear partition by means of a rear junction flange.

According to one variation, at least part of the outer fairing and the intermediate junction are materially integral.

According to another variation, the air intake has an air intake lip, formed materially integral of the air intake lip, on the one hand with the inner fairing, and on the other hand with the outer fairing, extended to the rear partition to which it is connected.

According to yet another variation, the outer fairing is directly connected to the rear partition.

According to one variation, the outer fairing is connected to the rear partition by means of a rear junction flange.

In one form, the inner fairing is perforated on a zone receiving at least one attached acoustic attenuation structure and at least one attached acoustic attenuation structure is formed of a cellular core and an acoustically resistive wall. The perforated zone then forms a perforated wall and allows the reception of at least part of an air flow received from an air flow path.

The expression "resistive wall" or "acoustically resistive wall" will be understood to mean a wall of the acoustic attenuation structure allowing the maintenance at least in part of an air flow received by the acoustic attenuation structure from the air flow path. The acoustic function of the acoustic attenuation structure can be achieved when the acoustic attenuation structure formed by the cellular core and the acoustically resistive wall is attached to the pierced zone.

Advantageously, at least one acoustic structure is attached to an outer face of the inner fairing, that is to say the face of the inner fairing, external with respect to a main axis of the nacelle. In other words, it is the face of the inner fairing located opposite the outer fairing.

In another variation, the air intake comprises a step formed in a zone extending from a portion of the air intake lip and the inner fairing. The step is configured to accommodate at least one acoustic attenuation structure. This allows to provide an air intake with an improved aerodynamic design and to facilitate the flow of the air flow. The step delimits an upstream portion of the zone and a downstream portion of the zone. The downstream portion can be radially offset from the upstream portion. More particularly, the downstream portion is driven outwardly relative to the upstream portion relative to the main axis. The step comprises the upstream portion and the downstream portion. The step may comprise an inclined or strictly radial portion formed in the zone.

According to one variation, the step is formed in a zone delimiting the air intake lip and the inner fairing.

In such an air intake, in order to allow the distinction between the air intake lip and the inner fairing, the present disclosure should be compared with the prior art described in FIG. 2.

According to another variation, the step is formed in the air intake lip and at least one acoustic attenuation structure extends into the air intake lip. In other words, the acoustic attenuation structure overlaps both the air intake lip and the inner fairing.

In this last variation, at least one acoustic attenuation structure is formed of a cellular core and a perforated wall, the perforated wall flush with the air intake lip.

Also in this last variation, at least one acoustic attenuation structure is attached to an internal face of the inner fairing, that is to say the face opposite the external face of the inner fairing.

According to another variation, the air intake comprises a front partition delimiting the air intake lip. The front partition may have a curvilinear, inclined or straight shape. The partitioning of the air intake lip makes it possible, for example, to integrate a defrosting system.

According to yet another variation, the air intake comprises a reinforcing element bearing on the front partition.

According to one variation, the front partition bears on the step. Advantageously, such a bearing makes it possible to improve the immobilization of the step.

According to another variation, the inner fairing and/or the outer fairing of the air intake comprises at least one stiffener.

According to yet another variation, the inner fairing and/or the outer fairing of the air intake comprises at least one over thickness. The over thickness makes it possible on the one hand to stiffen the structure of the air intake and on the other hand to fix the stiffeners when they are attached by riveting. The over thicknesses can be used to fix the stiffeners when they are added by welding.

It will be understood by the term "over thickness" that a section of the inner fairing or of the outer fairing is thicker than another adjacent section of this fairing.

Advantageously, the stiffeners are attached to the inner fairing and/or to the outer fairing.

According to one variation, the partition or rear support is supported by the inner fairing.

According to another variation, the rear partition or support is supported by an over thickness of the inner fairing.

According to yet another variation, the present disclosure relates to a nacelle comprising an air intake as described above.

According to one form, the present disclosure relates to a method for manufacturing an annular structure and an air intake lip as described above, in which an annular structure including an inner fairing and at least one part of an outer fairing is made in one piece and is made materially integral with the air intake lip.

According to another variation, the annular structure and the air intake lip are produced by means of a one-piece mold. It will be understood that the assembly formed by the annular structure and the air intake lip is formed by a mold using which this assembly is removed from the mold without disassembling the latter.

According to yet another variation, the annular structure and the air intake lip are produced by means of a mold comprising a first part and a second part, optionally if the lines have only an undercut.

Advantageously, the mold can comprise three or four parts. For example, when the mold has three parts, the first part can form the outer fairing, the second part can form the air intake lip, and a third part can form the inner fairing.

In one variation, a first part of the mold is configured to form at least part of the air intake lip and at least part of the outer fairing of the annular structure and a second part of the mold is configured to form the complementary part of the air intake lip and the inner fairing of the annular structure.

In another variation, a first part of the mold is configured to form the air intake lip and at least part of the outer fairing of the annular structure and a second part of the mold is configured to form the inner fairing of the annular structure.

In yet another variation, a first part of the mold is configured to form at least part of the air intake lip and the inner fairing of the annular structure and a second part of the mold is configured to form the complementary part of the air intake lip and at least part of the outer fairing of the annular structure.

In yet another variation, a first part of the mold is configured to form the air intake lip and the inner fairing of the annular structure and a second part of the mold is configured to form at least part of the outer fairing of the annular structure.

According to one variation, the method comprises a step of perforating a zone of the inner fairing receiving an acoustic attenuation structure.

According to another variation, the second part is configured to form a step in zero (0) extending from a portion of the air intake lip and a portion of the inner fairing.

According to yet another variation, the first part is configured to form a step in a zone extending from a portion of the intake lip and a portion of the inner fairing.

In one variation, the method comprises a step in which an acoustic attenuation structure is attached to the inner fairing of the air intake.

In another variation, the annular structure and the air intake lip are made of a metallic material.

In yet another variation, the annular structure and the air intake lip are made of a composite material.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
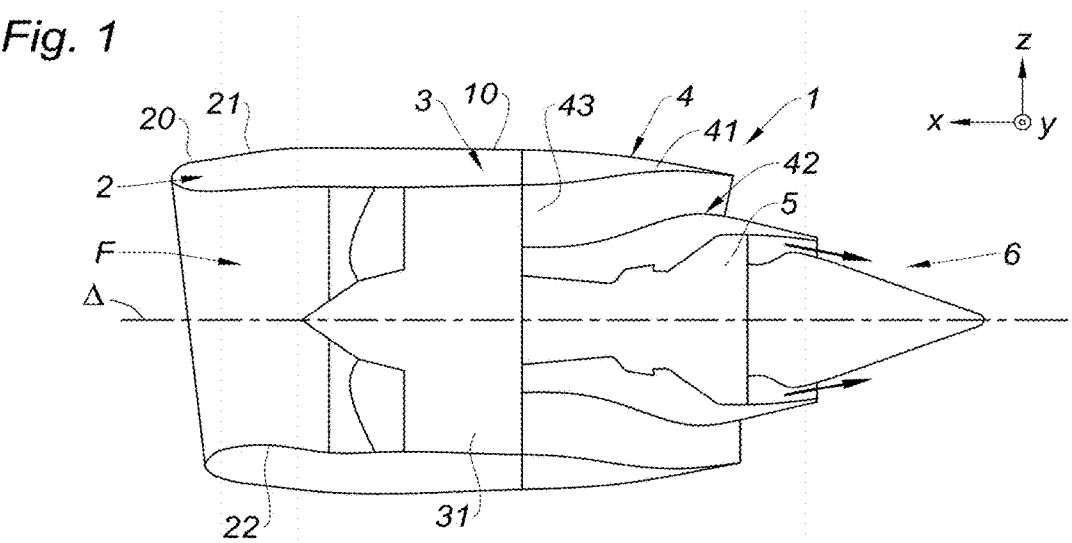
FIG. 1 is a side view of a nacelle according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In all of these figures, identical or similar references designate identical or similar members or sets of members.

The expression "upstream" and "front" will be used interchangeably to designate the upstream side of the air intake and the expression "downstream" and "rear" will be used interchangeably to designate the downstream side of the air intake.

The expressions "upstream" and "downstream" refer to the direction of the flow of air entering and exiting a nacelle.

The expression "connected" means two mechanical elements assembled together by any suitable fixing means, such as screws, rivets, welding or gluing. The nacelle 1 comprises an upstream section forming an air intake 2, a median section 3 surrounding a fan 31 of an engine 5 such as a bypass turbojet engine and a downstream section 4 accommodating a thrust reverser system (not visible), the nacelle serving to channel the air flows generated by the engine 5 and extends along a main axis Δ.

The air intake 2 comprises, on the one hand, an air intake lip 20 forming a leading edge adapted to allow improved capture towards the turbojet engine of the air desired to supply the fan 31 and inner compressors of the turbojet engine, and on the other hand, an annular structure 21, 22 on which is attached the air intake lip 20, configured to properly channel the air towards the blades of the fan 31. The air intake lip 20 and the annular structure 21, 22 are attached upstream of a fan casing belonging to the median section 3 of the nacelle 1. The downstream section 4 for its part comprises an inner structure 42 (also called "Inner fixed structure" or "IFS") surrounding the upstream part of the turbojet engine 5, an outer structure 41 (also called "outer fan structure" or "OFS") forming the cold flow channel and fixed relative to the engine, and a movable cowl including thrust reversal means.

The inner structure 42 and the outer structure 41 delimits a flow path 43 allowing the passage of an air flow F penetrating the nacelle 1 at the level of the air intake lip 20.

The nacelle 1 generally includes a top 10 configured to receive an attachment engine pylon making it possible to fix said nacelle 1 to a wing of the aircraft. To do this, said top 10 includes means for fixing said engine pylon.

The turbojet engine nacelle is in particular suspended from the engine pylon, by means of a beam at the level of this top 10. The nacelle 1 ends with an ejection nozzle 6.

Figure 2:
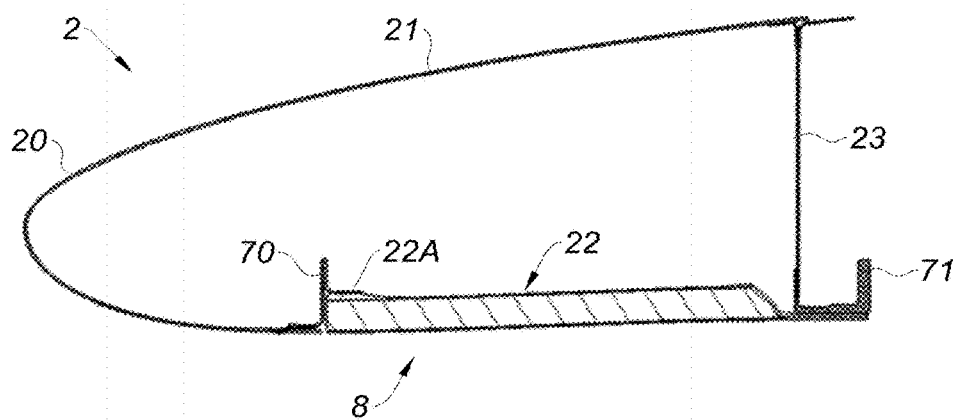
FIG. 2 is a partial longitudinal sectional view of an air intake of the prior art.

FIG. 2 represents an air intake 2 of a turbojet engine nacelle of the prior art. The air intake 2 comprises an annular structure 21, 22 and a transverse annular reinforcement and load transfer partition, called a "rear partition" 23. The annular structure 21, 22 comprises an outer fairing 21 providing an outer aerodynamic continuity, an inner fairing 22 providing an inner aerodynamic continuity.

The outer fairing 21 and the inner fairing 22 are connected upstream by the air intake lip 20. The air intake lip 20 provides the junction between the two fairings 21, 22.

In the present air intake 2 as shown in FIG. 2, the air intake lip 20 is integrated into the outer fairing 21. The air intake lip 20 and the outer fairing 21 are materially integral. This part then forms an elongated air intake lip 20, 21.

The elongated air intake lip 20, 21 and the inner fairing 22 are manufactured separately and are assembled to each other by means of a series of front mounting flanges 70, here represented by a front mounting flange 70.

The inner fairing 22 extends to the rear partition 23 to which it is connected.

One end of the rear partition 23 is connected to the outer fairing 21, and the other end of the rear partition 23 is connected to the inner fairing 22 by means of a rear mounting flange 71 connected to the inner fairing 22. The rear partition 23 is supported by the rear fixing flange 71.

The inner fairing 22 comprises an acoustic panel 8.

The assembly of the elongated air intake lip 20, 21 to the inner fairing 22 has, in addition to the drawbacks known from the prior art, the desire to provide a deformation of the inner fairing in a zone 22A connecting the inner fairing 22 to the 70 front mounting flange. Such a deformation limits the acoustic performance of the acoustic panel 8.

Moreover, such an air intake 2 formed by the elongated air intake lip 20, 21 and the inner fairing 22 connected by means of fixing flanges or joint bars has the effect of transmitting mechanical vibrations between the elongated air intake lip 20, 21 and the inner fairing 22 being able to impact the acoustic performance of the acoustic panel 8.

Figure 3:
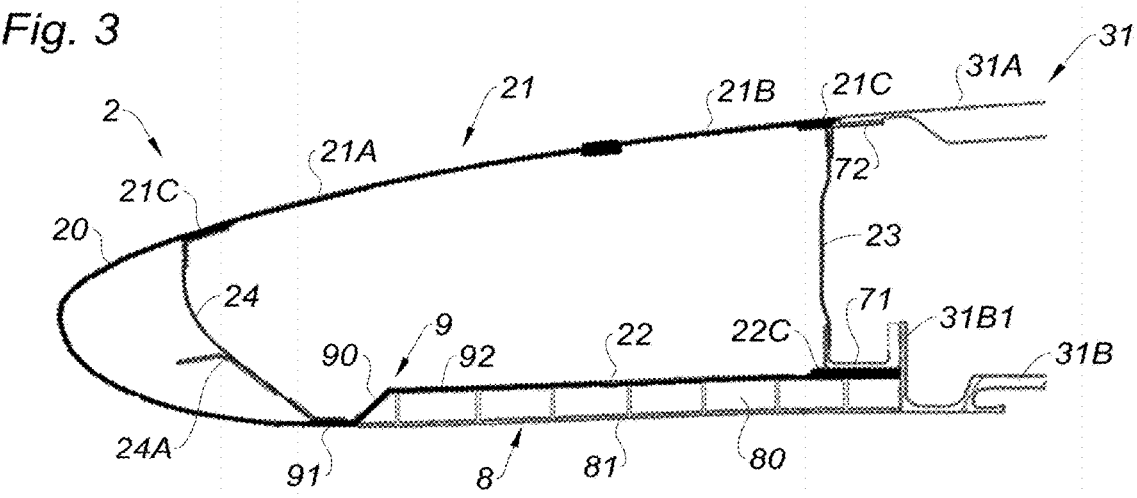
FIG. 3 is a partial longitudinal sectional view of an air intake according to a first form of the present disclosure.

FIG. 3 represents an air intake 2 of a nacelle 1 according to a first form of the present disclosure. The air intake 2 comprises an air intake lip 20, an annular structure 21, 22 and a rear partition 23 which delimits the air intake 2 and a median section 3 of the nacelle.

The annular structure 21, 22 comprises an outer fairing 21 providing an outer aerodynamic continuity and an inner fairing 22 providing an inner aerodynamic continuity.

The outer fairing 21 and the inner fairing 22 are connected upstream by an air intake lip 20. The air intake lip 20 provides the junction between the two fairings 21, 22.

In the present example, the outer fairing 21 is formed of an outer fairing part 21A and an intermediate junction 21B. The outer fairing part 21A and the intermediate junction 21B are connected by means of a junction flange.

In a variant (not represented), the outer fairing part 21A and the intermediate junction 21B can be directly connected to each other by suitable fixing means, such as screws, rivets, welding or gluing.

The air intake lip 2, the outer fairing part 21A and the inner fairing 22 are materially integral and thus form a one materially integral piece.

This part then forms an elongated air intake lip 20, 21, 22 which extends through its inner fairing 22 to the rear partition 23.

The rear partition 23 bears at its upper end on an over thickness 21C integrated into the intermediate junction 21B. The intermediate junction 21B is thus directly connected to the rear partition 23 by any fixing means as introduced previously.

The other end of the rear partition 23 is connected to the inner fairing 22 by means of a rear fixing flange 71. The rear fixing flange 71 is connected to an over thickness 22C of the inner fairing 22. The rear fixing flange 71 can be by any fixing means such as introduced previously.

In a variant (not represented), the inner fairing 22 can be directly connected to the rear partition 23 by any fixing means as introduced previously.

Thus, the loads received by the outer fairing 21 are at least partly transferred to the inner fairing 22.

It will be understood by the term over thickness that a section of the inner fairing 22 or of the outer fairing 21 is thicker than another adjacent section of this fairing.

The intermediate junction 21B is connected to a fan cowl 31A of the median section 3 by means of a casing junction flange 72. The casing junction flange 72 connects both the intermediate junction 21B, the rear partition 23 and the fan cowl 31A.

The inner fairing 22 is connected to a fan casing 31B by means of the rear mounting flange 71. The rear mounting flange 71 is directly connected to a mounting flange 31B1 of the fan casing 31B.

In the present example, the fan casing 31B and the fixing flange of the casing 31B1 are materially integral, that is to say they are made in one piece. The air intake 2 comprises an annular front partition 24 "said front partition" having a curvilinear shape which delimits the air intake lip 20 of the inner 22 and outer fairings 21. The partitioning of the air intake lip 2 in a D-shaped space makes it possible, for example, to integrate a defrosting system therein.

In other non-represented variants, the front partition can be inclined or straight. One end of the front partition 24 is connected to an over thickness 21C of the outer fairing 21, for example by welding. Another end of the front partition 24 is connected to the inner fairing 22. The front partition 24 can advantageously be completed by a reinforcing element 24A advantageously arranged on its curvilinear, inclined or straight portion.

The air intake 2 comprises a step 9 formed in a zone situated between the air intake lip 20 and the inner fairing 22. In the present example, the step 9 is formed in a zone delimiting the air intake lip 20 and the inner fairing 22.

The step 9 is configured to accommodate at least one attached acoustic attenuation structure 8. This configuration thus makes it possible to provide an air intake having an improved aerodynamic design and to facilitate the flow of the air flow and furthermore promotes the acoustic performance of the acoustic attenuation structure 8.

The step 9 comprises an inclined portion 90 formed in said zone situated between the air intake lip 20 and the inner fairing 22. The inclined portion 90 delimits an upstream portion 91 of said zone and a downstream portion 92 of this said zone. The downstream portion 92 is offset relative to the upstream portion 91. More particularly, the downstream portion 92 is depressed relative to the upstream portion 91. The step 9 is then formed of the upstream portion 91, the inclined portion 90 and the downstream portion 92. The downstream portion 92 is for example a portion of the inner fairing 22 and the upstream portion is for example a portion of the air intake lip 20.

In the present example, the end of the front partition 24 connected to the inner fairing 22 bears on the inclined portion 90 of the step 9. Such a bearing makes it possible to improve the immobilization of the step 9.

The air intake 2 comprises at least one attached acoustic attenuation structure 8. In the present example, only one acoustic attenuation structure is represented. In the present example, the acoustic attenuation structure 8 is formed of a pierced acoustic wall 81 which is flush with the air intake lip 20 and of a cellular core 80.

Thus, the inner fairing 22 receiving the acoustic attenuation structure 8 forms the resistive wall.

By attached acoustic attenuation structure is meant a structure manufactured separately from the air intake 2 and which is subsequently assembled on the inner fairing 22. The acoustic attenuation structure 8 can be attached to the inner fairing 22 by all fixing means as defined above.

The inner fairing 22 has an outer face located opposite the outer fairing 21 and an inner face opposite the outer face.

In the present example, the acoustic attenuation structure 8 is attached to the internal face of the inner fairing 22.

According to this variation, the rear fixing flange 71 rests on the acoustic attenuation structure 8 by means of the over thickness 22C of the inner fairing 22.

Figure 4:
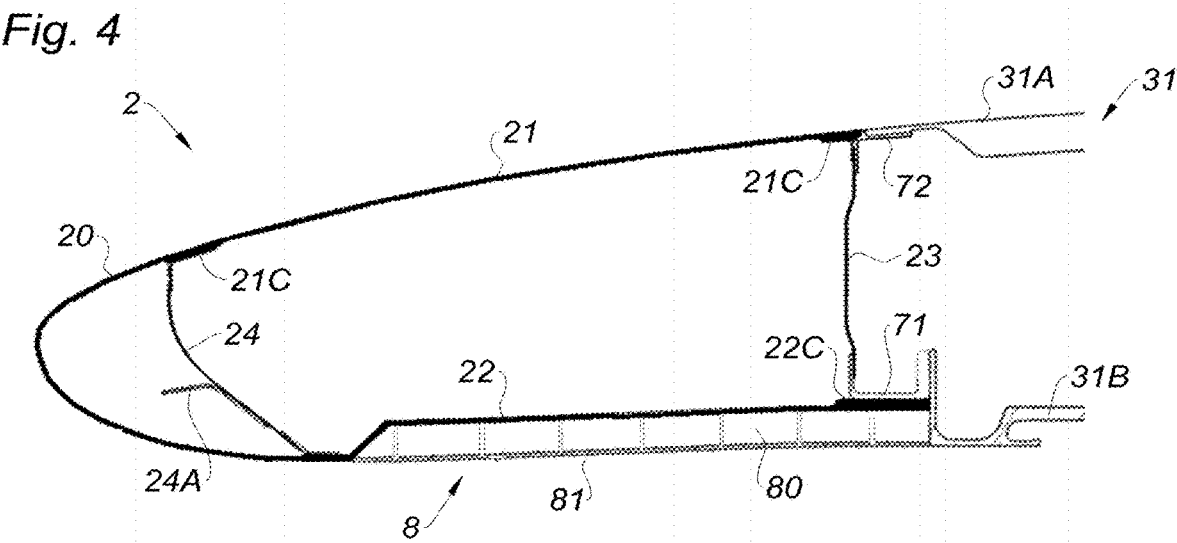
FIG. 4 is a partial longitudinal sectional view of an air intake according to a second form of the present disclosure.

FIG. 4 is a representation of the air intake 2 of FIG. 3 in which the outer fairing part 21A and the intermediate junction 21B forming the outer fairing 21 are materially integral thus forming the outer fairing 21A.

It will then be understood that the air intake 2 has an air intake lip 20 formed by making the air intake lip 20 materially integral on the one hand with the inner fairing 22 and on the other part with the outer fairing 21, each extended to the rear partition 23 to which they are connected.

In this form, the outer fairing 21 is directly connected to the rear partition 23 by any fixing means previously introduced.

Figure 5:
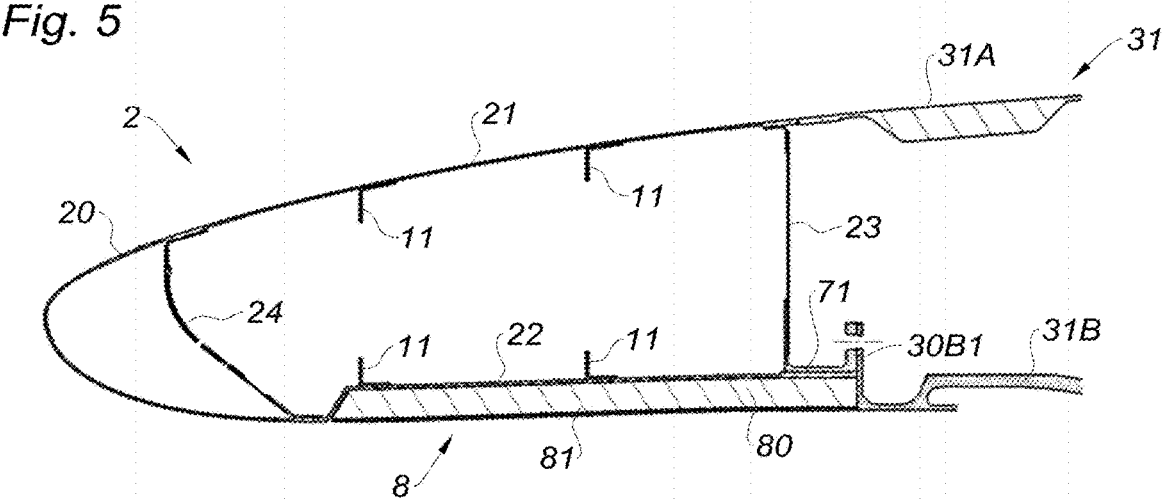
FIG. 5 is a partial longitudinal sectional view of an air intake according to an alternate form of the present disclosure.

FIG. 5 is an illustration of an alternative form of the air intake 2 illustrated in FIG. 4 in which the fixing flange 30B1 of the fan casing 31B integrally formed with the fan casing 31B is connected to the rear fixing flange 71 by means of a bolt. In the present example, one end of the rear fixing flange 71 extends beyond its opposite end connected to the fixing flange 30B1.

In the present example, the air intake 2 comprises stiffeners 11 attached to the inner 22 and/or outer fairings 21 of the annular structure 21, 22. In this example, two stiffeners 11 are attached to the outer fairing 21 and two stiffeners 11 are attached to the inner fairing 22. The stiffeners 11 of the inner fairing 22 are arranged opposite the stiffeners 11 of the outer fairing 21.

The stiffeners 11 of the inner and outer fairings 21, 22 can be attached by welding, brazing, and/or gluing. In a variant (not represented), the stiffeners 11 can be attached by riveting. When the stiffeners 11 are attached to the fairings by means of rivets, the latter are assembled to the corresponding fairings 21, 22 by means of over thicknesses 21C, 22C.

Figure 6:
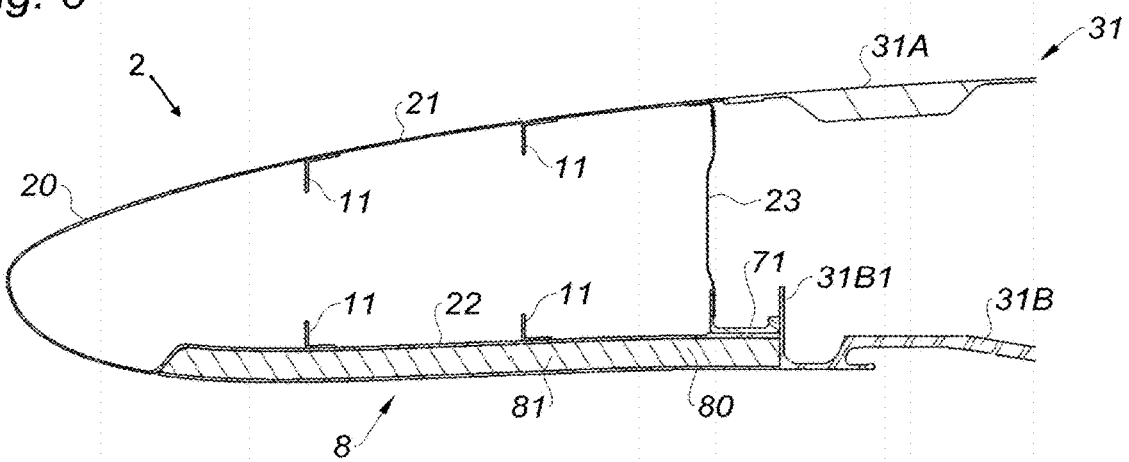
FIG. 6 is a partial longitudinal sectional view of an air intake according to a third form of the present disclosure.

FIG. 6 represents an air intake 2 according to one form of the present disclosure. The air intake 2 comprises the annular structure 21, 22 comprising the outer fairing 21 and the inner fairing 22 formed materially integral with the air intake lip. The air intake 2 also comprises a rear partition 23.

In this form, the air intake 2 has no front partition.

The step 9 is formed in the air intake lip 20. The acoustic attenuation structure 8 attached to the inner fairing 22 then extends into the air intake lip 2.

In other words, the sound attenuation structure 8 overlaps both the air intake lip 20 and the inner fairing 22.

The acoustic attenuation structure 8 is attached to the inner face of the inner fairing 22 and extends along this fairing from the air intake lip 20 to the fixing flange of the casing 31B1. This makes it possible to increase the acoustic treatment surface.

The inner fairing 22 is connected to the fan casing 31B by means of the rear mounting flange 71. The rear mounting flange 71 is connected to the mounting flange 31B1 of the fan casing 31B.

The inner fairing 22 and/or the outer fairing 21 also each comprises two added stiffeners 11. The stiffeners 11 of the inner fairing 22 are arranged opposite the stiffeners 11 of the outer fairing 21.

Figure 7:
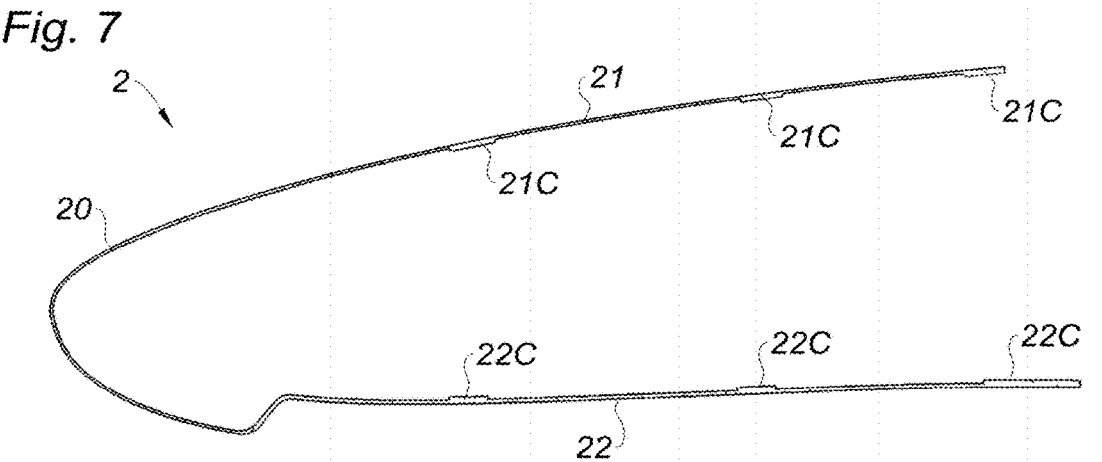
FIG. 7 is a partial longitudinal sectional view of the air intake of FIG. 6.

FIG. 7 represents the annular structure 21, 22 of the air intake 2 comprising the outer fairing 21 and the inner fairing 22 formed materially integral with the air intake lip 20 according to another form. In this form, the acoustic attenuation structure 8 has been removed, that is to say it has been removed from the inner fairing 22.

The air intake 2 comprises over thicknesses 21C, 22C integrated into the inner 22 and/or outer 21 fairings.

The over thicknesses 21C, 22C make it possible, on the one hand, to stiffen the structure of the air intake and, on the other hand, to fix the stiffeners 11 when they are attached by riveting.

The outer fairing 21 has three over thicknesses 21C. The over thickness 21C located at the most downstream end of the outer fairing 21 is particularly useful for fixing the rear partition 23 (not represented), for example by means of screws.

The inner fairing 22 has three over thicknesses 22C. The over thickness located at the most downstream end of the inner fairing 22 is particularly useful for supporting the rear fixing flange 71. The rear fixing flange 71 and the inner fairing 22 can be connected for example by rivets. The rear mounting flange 71 is particularly useful for supporting the rear partition 23 (not represented) and/or connecting the inner fairing 22 to the fan casing (not represented).

Figure 8:
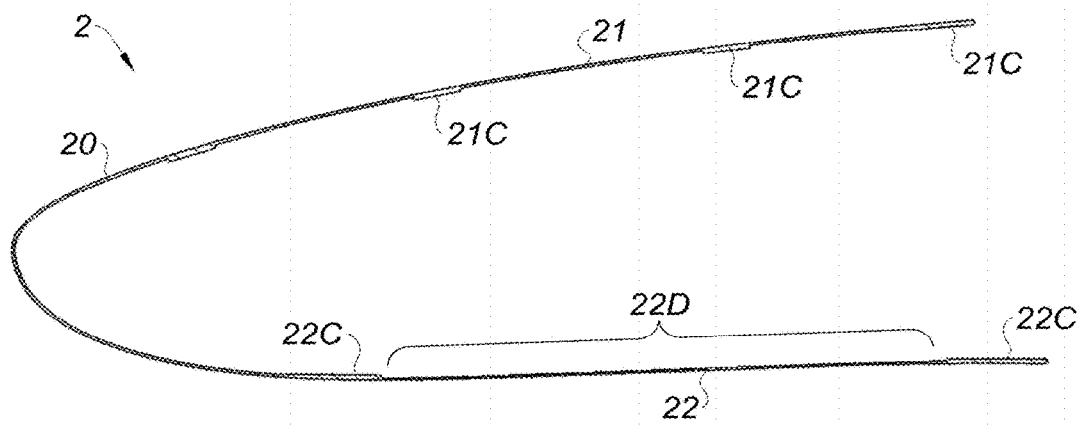
FIG. 8 is a partial longitudinal sectional view of an air intake according to a fourth form of the present disclosure.

FIG. 8 represents an air intake 2 according to another form of the present disclosure.

In this form, the inner fairing 22 has no step. In this form, the inner fairing 22 is perforated on a zone 22D, that is to say it has a plurality of holes (not visible) arranged regularly on the zone configured to receive at least one acoustic attenuation structure 8 related to the inner fairing 22.

The perforated zone 22D then forms a perforated wall and allows the reception of at least part of an air flow received from an air flow path.

In this form, the laminarity is improved due to the absence of a junction element at the air intake which usually disrupts the aerodynamic flow of air.

In this form, the acoustic attenuation structure (not represented) is formed of a cellular core and an acoustically resistive wall.

In this form, the acoustic attenuation structure is configured to be disposed on the external face of the inner fairing 22 (for example illustrated in FIG. 9) that is to say the face of the inner fairing, external with respect to a main axis of the nacelle.

The air intake 2 also comprises over thicknesses 21C, 22C integrated into the inner 22 and/or outer 21 fairings.

The outer fairing 21 has four over thicknesses 21C. The over thickness located at the most downstream end of the outer fairing 21 is particularly useful for fixing a rear partition 23, for example by means of bolts.

The inner fairing 22 has two over thicknesses 22C. The over thickness located at the most downstream end of the inner fairing 22 is particularly useful for supporting a rear mounting flange 71.

Figure 9:
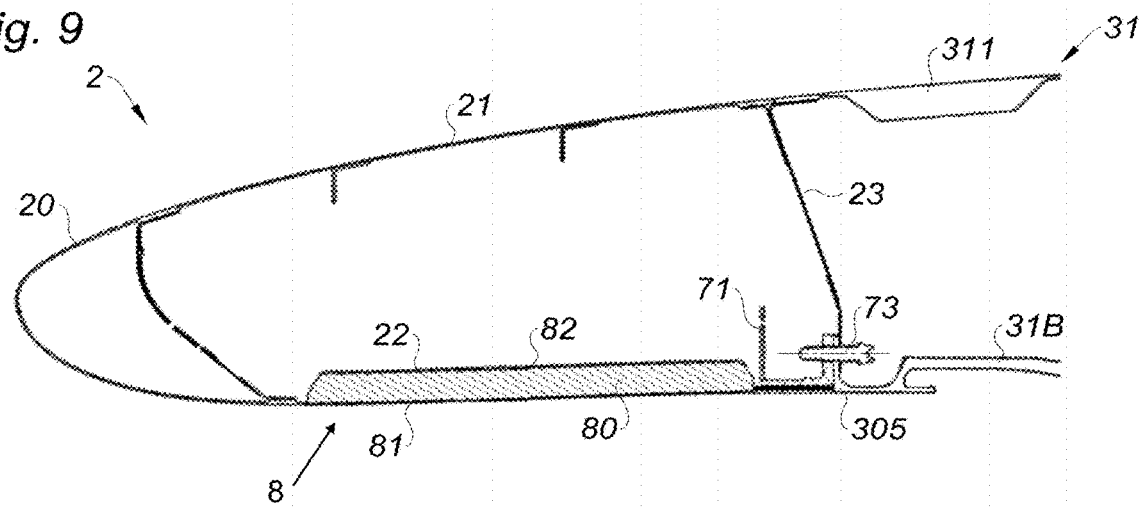
FIG. 9 is a partial longitudinal sectional view of an air intake according to an alternate form of the present disclosure.

FIG. 9 represents a nacelle comprising an air intake 2 according to another form of the present disclosure. The air intake 2 comprises an air intake lip 20 which provides the junction between the outer fairing 21 and the inner fairing 22 and which is integrated with these inner 22 and outer 21 fairings thus forming an air intake 2 formed materially integral.

The air intake 2 also comprises, at its inner fairing 22, a rear fixing flange 71 configured to cooperate with a fixing flange 305 of the casing which is integral with the fan casing 31B at its upstream end.

This assembly of the flanges 71 and 305 secures the air intake 2 with the median section 3. This assembly is completed and secured by fixing means 73 of the screw-nut type.

The outer fairing 21 has a downstream end configured to be positioned in a junction zone flush with a front end of the fan cowl 31 so as to provide the outer aerodynamic continuity of the nacelle 1.

To maintain a certain rigidity to the structure, this outer fairing 21 bears against a rear partition 23. In one form, this bearing is completed by fixing means for fixing the rear partition 23 to said outer fairing 21 of the air intake 2. These fixing means can be for example screw-nut assemblies.

In the present example, the rear partition 23 extends radially through the thickness of the nacelle and is configured to be secured to the fan casing 31B, and more particularly secured to the fixing flange 305 of the casing 31B. More particularly, the rear partition 23 bears on a rear face of the fixing flange 305 of the casing 31B, that is to say opposite a front face configured to cooperate and/or be contiguous with a rear face of the rear fixing flange 71. This contributes to improve the load path.

In other words, the rear partition 23 extends from a lower end configured to be secured to the median section 3, and more particularly with the fan casing 31B, at the level of the fixing flange 305 of the casing 31B, up to at an upper end in contact at least with a downstream part of the outer fairing 21 of the air intake 2.

In the present example, the attached acoustic attenuation structure 8 is formed of a cellular core 80 and of an acoustically resistive wall 82.

The acoustic attenuation structure 8 is attached to the outer surface of the inner fairing 22, that is to say the surface opposite the internal surface of the inner fairing 22.

The inner fairing 22 is perforated on the zone receiving the acoustic attenuation structure 8.

Figure 10:
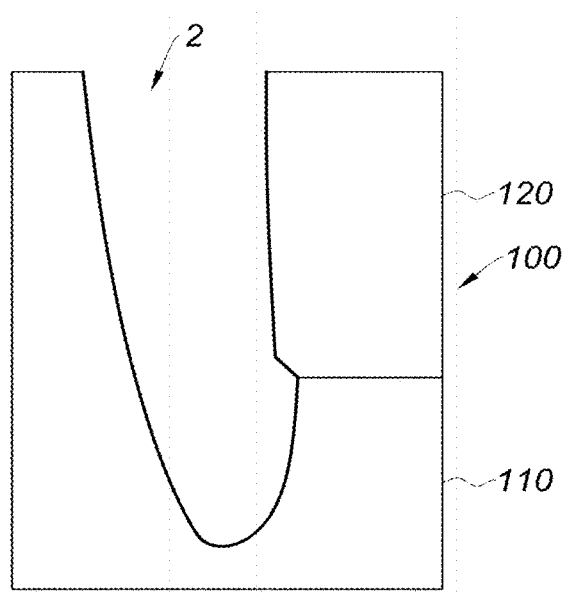
FIG. 10 is a schematic representation of the manufacture of an air intake according to the present disclosure using a mold represented in an assembled state.

FIG. 10 represents a mold 100 for manufacturing an annular structure 20, 21 and an air intake lip 20 materially integral according to one form of the present disclosure.

The manufacturing mold 100 is configured to produce the air intake lip 20, the annular structure 21, 22 including the inner fairing 22 and said at least part of the outer fairing 21 materially integral with the air intake lip 20. The manufacturing mold 100 comprises a first part 110 and a second part 120.

In this form, the first part 110 of the mold is configured to form the air intake lip 20 and the outer fairing 21 of the annular structure 21, 22. The second part 120 of the mold is configured to form the inner fairing 22 of the annular structure 21, 22.

In particular, the second part 120 of the mold 100 is configured to form the step 9 in the inner fairing 22 of the annular structure 21, 22.

The annular structure 21, 22 comprising the outer fairing 21 and the inner fairing 22 materially integral with the air intake lip 2, can be made of a metallic material or of a composite material.

In operation, the method for manufacturing the annular structure 21, 22 and the materially integral air intake lip 20 comprises a step of preparing the material which will be used to manufacture said part.

The material may be a metallic material or a composite material such as composite plies formed of carbon fibers.

The method can comprise a step of adjusting the thickness of the material used.

In the case of a metallic material, the thickness adjustment can be carried out by chemical machining. In the case of a composite material, the thickness adjustment, in particular an increase in thickness, can be achieved by adding or subtracting composite plies.

The method comprises a step of inserting the material into the mold 100 formed of the first 110 and second part 120.

The material is molded in the mold 100 so as to obtain the part formed of the annular structure 21, 22 and the air intake lip 20 in one piece in the desired shape.

In the case of an air intake made of a metallic material, the method can comprise a step of spinning carried out by turn (also called spin forming) consisting of a step of plastic deformation of a circular metal sheet. The metallic material of the air intake is of course in accordance with the performance of such a step.

Alternatively, the method can comprise an explosion forming step in which the deformation of the metal sheet is obtained by a pressure of a shock wave produced by an explosive.

Figure 11:
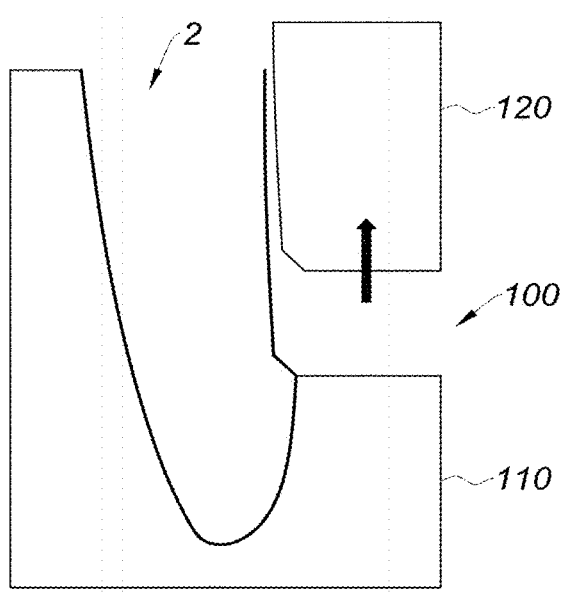
FIG. 11 is a schematic representation where the mold of FIG. 10 is disassembled.
Figure 12:
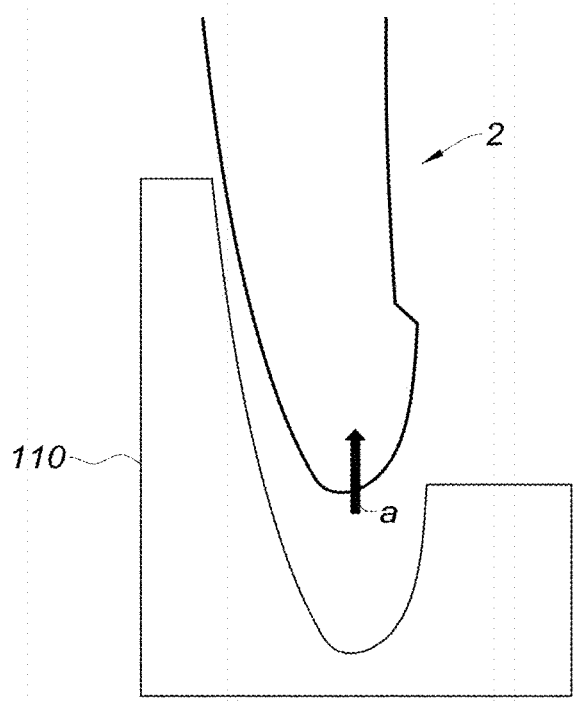
FIG. 12 is a schematic representation where the air intake is removed from the mold.

At the end of the molding, the second part 120 of the mold 100 is removed (FIG. 11) in the direction of the arrow "a" then the part formed from the annular structure 21, 22 and the newly formed air intake lip 20 is withdrawn from the first part 110 of the mold 100 (FIG. 12) in the direction of the arrow "a".

The manufacturing method may comprise a step of cutting to length the inner 22 and outer 21 fairings of the newly formed part in the event that one of these fairings will exhibit over lengths after molding.

The manufacturing method may comprise a step of adjusting the thicknesses of the inner and outer fairings, 21, 22 after molding. This step can be advantageously provided to form the over thicknesses 21C, 22C.

The manufacturing method can comprise a finishing step in which the surface of the inner and outer fairings 21, 22 is treated and/or painted.

The method can also comprise a step of adding stiffeners 11 at the level of the inner fairing 22 and/or of the outer fairing 21. The assembly of the stiffeners 11 to these fairings can be carried out by riveting or by welding.

The manufacturing method can comprise a step of quality control of the obtained part.

In a variant, when the part formed by the annular structure 21, 22 and the air intake lip 20 has no step, the method may comprise a step of perforating a zone 22D of the inner fairing receiving an acoustic attenuation structure.

Thus, thanks to the air intake according to the present disclosure in which the annular structure comprising the inner fairing 22, the outer fairing 21 and the materially integral air intake lip 20, the laminar flow of the air at the junction between the elongated air intake lip and the inner fairing 22 is increased.

Moreover, the manufacture of the air intake is simplified, less expensive and the overall mass of the air intake is reduced.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An air intake of a turbojet engine nacelle comprising:
   an air intake lip;
   an annular structure comprising at least a part of an outer fairing and an inner fairing joined to each other by the air intake lip;
   a rear partition connected to the inner fairing;
   a front partition; and
   at least one acoustic attenuation structure attached to the inner fairing of the annular structure,
   wherein said at least the part of the outer fairing, the air intake lip and the inner fairing are materially integral, and
   wherein the air intake lip includes a first end forming the at least the part of the outer fairing, and a second end opposing the first end, the inner fairing extending continuously from the second end of the air intake lip and being recessed from the second end of the air intake lip to define a step therebetween, the front partition being attached to the step to improve immobilization of the step.

2. The air intake according to claim 1 further comprising an intermediate junction connected to said at least the part of the outer fairing to form the outer fairing, the intermediate junction being connected to the rear partition.

3. The air intake according to claim 2, wherein said at least the part of the outer fairing and the intermediate junction are materially integral.

4. The air intake according to claim 1 further comprising a step formed in a zone extending from a portion of the air intake lip and a portion of the inner fairing, the step being configured to accommodate said at least one acoustic attenuation structure.

5. The air intake according to claim 4 wherein said at least one acoustic attenuation structure is formed of a perforated wall flush with the air intake lip and a cellular core.

6. The air intake according to claim 4 wherein the step is formed in a zone delimiting the air intake lip and the inner fairing.

7. The air intake according to claim 4 wherein the step is formed in the air intake lip and said at least one acoustic attenuation structure extends into the air intake lip.

8. The air intake according to claim 4 further comprising a front partition at least partially delimiting the air intake lip, the front partition bears on the step.

9. The air intake according to claim 1 further comprising a front partition at least partially delimiting the air intake lip.

10. A method for manufacturing an annular structure and an air intake lip according to claim 1, wherein the inner fairing and at least a part of the outer fairing is made materially integral with the air intake lip.

11. The method according to claim 10, wherein said annular structure and said air intake lip are produced by means of a one-piece mold.

12. The method according to claim 10, wherein said annular structure and said air intake lip are produced by means of a mold comprising a first part and a second part.

13. The method according to claim 12, wherein the first part of the mold is configured to form the air intake lip and said at least the part of the outer fairing of the annular structure, and the second part of the mold is configured to form the inner fairing of the annular structure.

14. The method according to claim 13, wherein the second part is configured to form the step in a zone extending between the air intake lip and the inner fairing.

15. The method according to claim 10, further comprising a step wherein an acoustic attenuation structure is attached to the inner fairing of the air intake.

16. The air intake according to claim 1, wherein the air intake lip includes a first end forming the at least the part of the outer fairing, and a second end opposing the first end, wherein an entire portion of the inner fairing is disposed downstream from the second end of the air intake lip and extends continuously from the second end of the air intake lip.

17. The air intake according to claim 1, wherein the inner fairing extends continuously from an end of the air intake lip and is recessed from the end of the air intake lip to define the step therebetween, an inner aerodynamic continuity being formed along the air intake lip including the end and the inner fairing.

18. An air intake of a turbojet engine nacelle comprising:
    an air intake lip;
    an annular structure comprising at least a part of an outer fairing and an inner fairing joined to each other by the air intake lip;
    a rear partition connected to the inner fairing;
    a front partition; and
    at least one acoustic attenuation structure attached to the inner fairing of the annular structure,
    wherein said at least the part of the outer fairing, the air intake lip and the inner fairing are materially integral, and
    wherein the air intake lip includes a first end forming the at least the part of the outer fairing, and a second end opposing the first end, the inner fairing extending continuously from the second end of the air intake lip and being recessed from the second end of the air intake lip to define a step therebetween, the front partition being attached to an inclined portion of the step to improve immobilization of the step.

* * * * *